United States Patent
Chang et al.

(10) Patent No.: US 9,026,572 B2
(45) Date of Patent: May 5, 2015

(54) SYSTEMS AND METHODS FOR ANTI-CAUSAL NOISE PREDICTIVE FILTERING IN A DATA CHANNEL

(75) Inventors: Wu Chang, Santa Clara, CA (US); Victor Krachkovsky, Allentown, PA (US); Fan Zhang, Milpitas, CA (US); Shaohua Yang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 645 days.

(21) Appl. No.: 13/220,142

(22) Filed: Aug. 29, 2011

(65) Prior Publication Data

US 2013/0054664 A1 Feb. 28, 2013

(51) Int. Cl.
*G06F 17/10* (2006.01)
*H04L 25/06* (2006.01)
*H04L 25/03* (2006.01)

(52) U.S. Cl.
CPC .............. *H04L 25/067* (2013.01); *G06F 17/10* (2013.01); *H04L 25/03038* (2013.01)

(58) Field of Classification Search
None
See application file for complete search history.

(56) References Cited

U.S. PATENT DOCUMENTS

| | | | |
|---|---|---|---|
| 5,278,703 A | 1/1994 | Rub | |
| 5,278,846 A | 1/1994 | Okayama et al. | |
| 5,317,472 A | 5/1994 | Schweitzer, III | |
| 5,325,402 A | 6/1994 | Ushirokawa | |
| 5,392,299 A | 2/1995 | Rhines et al. | |
| 5,471,500 A | 11/1995 | Blaker et al. | |
| 5,513,192 A | 4/1996 | Janku et al. | |
| 5,523,903 A | 6/1996 | Hetzler | |
| 5,550,870 A | 8/1996 | Blaker et al. | |
| 5,612,964 A | 3/1997 | Haraszti | |
| 5,701,314 A | 12/1997 | Armstrong et al. | |
| 5,710,784 A | 1/1998 | Kindred et al. | |
| 5,712,861 A | 1/1998 | Inoue et al. | |
| 5,717,706 A | 2/1998 | Ikeda | |
| 5,768,044 A | 6/1998 | Hetzler | |
| 5,802,118 A | 9/1998 | Bliss et al. | |
| 5,844,945 A | 12/1998 | Nam et al. | |
| 5,898,710 A | 4/1999 | Amrany | |
| 5,923,713 A | 7/1999 | Hatakeyama | |
| 5,978,414 A | 11/1999 | Nara | |
| 5,983,383 A | 11/1999 | Wolf | |

(Continued)

FOREIGN PATENT DOCUMENTS

| | | |
|---|---|---|
| EP | 0522578 | 1/1993 |
| EP | 0631277 | 12/1994 |

(Continued)

OTHER PUBLICATIONS

U.S. Appl. No. 11/461,026, filed Jul. 31, 2006, Tan, Weijun.

(Continued)

*Primary Examiner* — Michael D Yaary
(74) *Attorney, Agent, or Firm* — Hamilton DeSanctis & Cha (57) ABSTRACT

Various embodiments of the present invention provide systems and methods for data processing. As an example, a data processing circuit is disclosed that includes a data detector circuit. The data detector circuit includes an anti-causal noise predictive filter circuit and a data detection circuit. In some cases, the anti-causal noise predictive filter circuit is operable to apply noise predictive filtering to a detector input to yield a filtered output, and the data detection circuit is operable to apply a data detection algorithm to the filtered output derived from the anti-causal noise predictive filter circuit.

19 Claims, 4 Drawing Sheets (56) References Cited

U.S. PATENT DOCUMENTS

| | | | |
|---|---|---|---|
| 6,005,897 A | 12/1999 | McCallister et al. | |
| 6,023,783 A | 2/2000 | Divsalar et al. | |
| 6,029,264 A | 2/2000 | Kobayashi et al. | |
| 6,041,432 A | 3/2000 | Ikeda | |
| 6,065,149 A | 5/2000 | Yamanaka | |
| 6,097,764 A | 8/2000 | McCallister et al. | |
| 6,145,110 A | 11/2000 | Khayrallah | |
| 6,216,249 B1 | 4/2001 | Bliss et al. | |
| 6,216,251 B1 | 4/2001 | McGinn | |
| 6,229,467 B1 | 5/2001 | Eklund et al. | |
| 6,266,795 B1 | 7/2001 | Wei | |
| 6,317,472 B1 | 11/2001 | Choi et al. | |
| 6,351,832 B1 | 2/2002 | Wei | |
| 6,377,610 B1 | 4/2002 | Hagenauer et al. | |
| 6,381,726 B1 | 4/2002 | Weng | |
| 6,438,717 B1 | 8/2002 | Butler et al. | |
| 6,473,878 B1 | 10/2002 | Wei | |
| 6,476,989 B1 | 11/2002 | Chainer et al. | |
| 6,625,775 B1 | 9/2003 | Kim | |
| 6,657,803 B1 | 12/2003 | Ling et al. | |
| 6,671,404 B1 | 12/2003 | Katawani et al. | |
| 6,748,034 B2 | 6/2004 | Hattori et al. | |
| 6,757,862 B1 | 6/2004 | Marianetti | |
| 6,775,334 B1* | 8/2004 | Liu et al. | 375/341 |
| 6,785,863 B2 | 8/2004 | Blankenship et al. | |
| 6,788,654 B1 | 9/2004 | Hashimoto et al. | |
| 6,810,502 B2 | 10/2004 | Eidson | |
| 6,980,382 B2 | 12/2005 | Hirano et al. | |
| 6,986,098 B2 | 1/2006 | Poeppelman | |
| 7,010,051 B2 | 3/2006 | Murayama et al. | |
| 7,047,474 B2 | 5/2006 | Rhee et al. | |
| 7,058,873 B2 | 6/2006 | Song et al. | |
| 7,073,118 B2 | 7/2006 | Greeberg et al. | |
| 7,093,179 B2 | 8/2006 | Shea | |
| 7,113,356 B1 | 9/2006 | Wu | |
| 7,136,244 B1 | 11/2006 | Rothbert | |
| 7,173,783 B1 | 2/2007 | McEwen et al. | |
| 7,184,486 B1 | 2/2007 | Wu et al. | |
| 7,191,378 B2 | 3/2007 | Eroz et al. | |
| 7,203,015 B2 | 4/2007 | Sakai et al. | |
| 7,203,887 B2 | 4/2007 | Eroz et al. | |
| 7,236,757 B2 | 6/2007 | Raghavan et al. | |
| 7,257,764 B2 | 8/2007 | Suzuki et al. | |
| 7,310,768 B2 | 12/2007 | Eidson et al. | |
| 7,313,750 B1 | 12/2007 | Feng et al. | |
| 7,370,258 B2 | 5/2008 | Iancu et al. | |
| 7,403,752 B2 | 7/2008 | Raghavan et al. | |
| 7,430,256 B2 | 9/2008 | Zhidkov | |
| 7,502,189 B2 | 3/2009 | Sawaguchi et al. | |
| 7,505,537 B1 | 3/2009 | Sutardja | |
| 7,509,927 B2 | 3/2009 | Mukomilow | |
| 7,523,375 B2 | 4/2009 | Spencer | |
| 7,587,657 B2 | 9/2009 | Haratsch | |
| 7,590,168 B2 | 9/2009 | Raghavan et al. | |
| 7,702,989 B2 | 4/2010 | Graef et al. | |
| 7,712,008 B2 | 5/2010 | Song et al. | |
| 7,738,201 B2 | 6/2010 | Jin et al. | |
| 7,752,523 B1 | 7/2010 | Chaichanavong | |
| 7,801,200 B2 | 9/2010 | Tan | |
| 7,802,163 B2 | 9/2010 | Tan | |
| 8,170,089 B2* | 5/2012 | Park et al. | 375/229 |
| 8,249,203 B2* | 8/2012 | Sun et al. | 375/346 |
| 2003/0063405 A1 | 4/2003 | Jin et al. | |
| 2003/0081693 A1 | 5/2003 | Raghavan et al. | |
| 2003/0087634 A1 | 5/2003 | Raghavan et al. | |
| 2003/0112896 A1 | 6/2003 | Raghavan et al. | |
| 2003/0134607 A1 | 7/2003 | Raghavan et al. | |
| 2004/0071206 A1 | 4/2004 | Takatsu | |
| 2004/0098659 A1 | 5/2004 | Bjerke et al. | |
| 2004/0132416 A1* | 7/2004 | Yee | 455/82 |
| 2005/0010855 A1 | 1/2005 | Lusky | |
| 2005/0078399 A1 | 4/2005 | Fung | |
| 2005/0111540 A1 | 5/2005 | Modrie et al. | |
| 2005/0157780 A1 | 7/2005 | Werner et al. | |
| 2005/0195749 A1 | 9/2005 | Elmasry et al. | |
| 2005/0216819 A1 | 9/2005 | Chugg et al. | |
| 2005/0273688 A1 | 12/2005 | Argon | |
| 2006/0020872 A1 | 1/2006 | Richardson et al. | |
| 2006/0031737 A1 | 2/2006 | Chugg et al. | |
| 2006/0123285 A1 | 6/2006 | De Araujo et al. | |
| 2006/0140311 A1 | 6/2006 | Ashley et al. | |
| 2006/0168493 A1 | 7/2006 | Song et al. | |
| 2006/0195772 A1 | 8/2006 | Graef et al. | |
| 2006/0210002 A1 | 9/2006 | Yang et al. | |
| 2006/0239339 A1* | 10/2006 | Brown et al. | 375/232 |
| 2006/0248435 A1 | 11/2006 | Haratsch | |
| 2006/0256670 A1 | 11/2006 | Park et al. | |
| 2007/0011569 A1 | 1/2007 | Vila Casado et al. | |
| 2007/0047121 A1 | 3/2007 | Eleftheriou et al. | |
| 2007/0047635 A1 | 3/2007 | Stojanovic et al. | |
| 2007/0110200 A1 | 5/2007 | Mergen et al. | |
| 2007/0230407 A1 | 10/2007 | Petrie et al. | |
| 2007/0286270 A1 | 12/2007 | Huang et al. | |
| 2008/0049825 A1 | 2/2008 | Chen et al. | |
| 2008/0055122 A1 | 3/2008 | Tan | |
| 2008/0065970 A1 | 3/2008 | Tan | |
| 2008/0069373 A1 | 3/2008 | Jiang et al. | |
| 2008/0168330 A1 | 7/2008 | Graef et al. | |
| 2008/0276156 A1 | 11/2008 | Gunnam | |
| 2008/0301521 A1 | 12/2008 | Gunnam | |
| 2009/0185643 A1 | 7/2009 | Fitzpatrick | |
| 2009/0199071 A1 | 8/2009 | Graef | |
| 2009/0235116 A1 | 9/2009 | Tan et al. | |
| 2009/0235146 A1 | 9/2009 | Tan | |
| 2009/0259915 A1 | 10/2009 | Livshitz et al. | |
| 2009/0273492 A1 | 11/2009 | Yang et al. | |
| 2009/0274247 A1 | 11/2009 | Galbraith et al. | |
| 2010/0002795 A1 | 1/2010 | Raghavan et al. | |
| 2010/0042877 A1 | 2/2010 | Tan | |
| 2010/0042890 A1 | 2/2010 | Gunnam | |
| 2010/0050043 A1 | 2/2010 | Valentin Savin | |
| 2010/0061492 A1 | 3/2010 | Noeldner | |
| 2010/0070837 A1 | 3/2010 | Xu et al. | |
| 2010/0101578 A1 | 4/2010 | Cha et al. | |
| 2010/0164764 A1 | 7/2010 | Nayak | |
| 2010/0185914 A1 | 7/2010 | Tan et al. | |
| 2011/0075569 A1 | 3/2011 | Marrow et al. | |
| 2011/0080211 A1 | 4/2011 | Yang et al. | |
| 2011/0167246 A1 | 7/2011 | Yang et al. | |

FOREIGN PATENT DOCUMENTS

| | | |
|---|---|---|
| EP | 1814108 | 8/2007 |
| WO | WO 2006/016751 | 2/2006 |
| WO | WO 2006/134527 | 12/2006 |
| WO | WO 2007/091797 | 8/2007 |
| WO | WO 2010/126482 | 4/2010 |
| WO | WO 2010/101578 | 9/2010 |

OTHER PUBLICATIONS

U.S. Appl. No. 11/461,198, filed Jul. 31, 2006, Tan, Weijun.
U.S. Appl. No. 11/461,283, filed Jul. 31, 2006, Tan, Weijun.
U.S. Appl. No. 12/540,283, filed Aug. 12, 2009, Liu, et al.
U.S. Appl. No. 12/652,201, filed Jan. 5, 2010, Mathew, et al.
U.S. Appl. No. 12/763,050, filed Apr. 19, 2010, Ivkovic, et al.
U.S. Appl. No. 12/792,555, filed Jun. 2, 2010, Liu, et al.
U.S. Appl. No. 12/887,317, filed Sep. 21, 2010, Xia, et al.
U.S. Appl. No. 12/887,330, filed Sep. 21, 2010, Zhang, et al.
U.S. Appl. No. 12/887,369, filed Sep. 21, 2010 Liu, et al.
U.S. Appl. No. 12/901,816, filed Oct. 11, 2010, Li, et al.
U.S. Appl. No. 12/901,742, filed Oct. 11, 2010, Yang.
U.S. Appl. No. 12/917,756, filed Nov. 2, 2010, Miladinovic, et al.
U.S. Appl. No. 12/947,931, filed Nov. 17, 2010, Yang, Shaohua.
U.S. Appl. No. 12/947,947, filed Nov. 17, 2010, Ivkovic, et al.
U.S. Appl. No. 12/972,942, filed Dec. 20, 2010, Liao, et al.
U.S. Appl. No. 12/992,948, filed Nov. 16, 2010, Yang, et al.
U.S. Appl. No. 13/021,814, filed Feb. 7, 2011, Jin, Ming, et al.
U.S. Appl. No. 13/031,818, filed Feb. 22, 2011 Xu, Changyou, et al.
U.S. Appl. No. 13/050,129, filed Mar. 17, 2011, Tan, et al.
U.S. Appl. No. 13/050,765, filed Mar. 17, 2011, Yang, et al.
U.S. Appl. No. 13/088,119, filed Apr. 15, 2011, Zhang, et al.

(56) References Cited

OTHER PUBLICATIONS

U.S. Appl. No. 13/088,146, filed Apr. 15, 2011, Li, et al.
U.S. Appl. No. 13/088,178, filed Apr. 15, 2011, Sun, et al.
U.S. Appl. No. 13/126,748, filed Apr. 28, 2011, Tan.
U.S. Appl. No. 13/167,764, filed Jun. 24, 2011, Li, Zongwang, et al.
U.S. Appl. No. 13/167,771, filed Jun. 24, 2011, Li, Zongwang, et al.
U.S. Appl. No. 13/167,775, filed Jun. 24, 2011, Li, Zongwang.
U.S. Appl. No. 13/186,146, filed Jul. 19, 2011, Mathew, et al.
U.S. Appl. No. 13/186,213, filed Jul. 19, 2011, Mathew, et al.
U.S. Appl. No. 13/186,234, filed Jul. 19, 2011, Xia, Haitao, et al.
U.S. Appl. No. 13/186,251, filed Jul. 19, 2011, Xia, Haitao, et al.
U.S. Appl. No. 13/186,174, filed Jul. 19, 2011, Mathew, et al.
U.S. Appl. No. 13/186,197, filed Jul. 19, 2011, Mathew, George et al.
U.S. Appl. No. 13/213,751, filed Aug. 19, 2011, Zhang, Fan, et al.
U.S. Appl. No. 13/213,808, filed Aug. 19, 2011, Jin, Ming.
U.S. Appl. No. 13/220,142, filed Aug. 29, 2011, Chang, Wu, et al.
U.S. Appl. No. 13/227,538, filed Sep. 8, 2011, Yang, Shaohua, et al.
U.S. Appl. No. 13/227,544, filed Sep. 8, 2011, Yang, Shaohua, et al.
U.S. Appl. No. 13/239,683, filed Sep. 22, 2011, Xu, Changyou.
U.S. Appl. No. 13/239,719, filed Sep. 22, 2011, Xia, Haitao, et al.
U.S. Appl. No. 13/251,342, filed Oct. 2, 2011, Xia, Haitao, et al.
U.S. Appl. No. 13/269,832, filed Oct. 10, 2011, Xia, Haitao, et al.
U.S. Appl. No. 13/269,852, filed Oct. 10, 2011, Xia, Haitao, et al.
U.S. Appl. No. 13/284,819, filed Oct. 28, 2011, Tan, Weijun, et al.
U.S. Appl. No. 13/284,730, filed Oct. 28, 2011, Zhang, Fan, et al.
U.S. Appl. No. 13/284,754, filed Oct. 28, 2011, Zhang, Fan, et al.
U.S. Appl. No. 13/284,767, filed Oct. 28, 2011, Zhang, Fan, et al.
U.S. Appl. No. 13/284,826, filed Oct. 28, 2011, Tan, Weijun, et al.
U.S. Appl. No. 13/295,150, filed Nov. 14, 2011, Li, Zongwang, et al.
U.S. Appl. No. 13/295,160, filed Nov. 14, 2011, Li, Zongwang, et al.
U.S. Appl. No. 13/251,340, filed Oct. 3, 2011, Xia, Haitao, et al.
Amer et al "Design Issues for a Shingled Write Disk System" MSST IEEE 26th Symposium May 2010.
Bahl, et al "Optimal decoding of linear codes for Minimizing symbol error rate", IEEE Trans. Inform. Theory, vol. 20, pp. 284-287, Mar. 1974.
Casado et al., Multiple-rate low- denstiy parity-check codes with constant blocklength, IEEE Transations on communications, Jan. 2009, vol. 57, pp. 75-83.
Collins and Hizlan, "Determinate State Convolutional Codes" IEEE Transactions on Communications, Dec. 1993.
Eleftheriou, E. et al., "Low Density Parity-Check Codes for Digital Subscriber Lines", Proc ICC 2002, pp. 1752-1757.
Fisher, R et al., "Adaptive Thresholding"[online] 2003 [retrieved on May 28, 2010] Retrieved from the Internet <URL:http://homepages.inf.ed.ac.uk/rbf/HIPR2/adpthrsh.htm.
Fossnorier, Marc P.C. "Quasi-Cyclic Low-Density Parity-Check Codes From Circulant Permutation Maricies" IEEE Transactions on Information Theory, vol. 50, No. 8 Aug. 8, 2004.
Gibson et al "Directions for Shingled-Write and Two-Dimensional Magnetic Recording System" Architectures: Synergies with Solid-State Disks Carnegie Mellon Univ. May 1, 2009.
K. Gunnam et al., "Next Generation iterative LDPC solutions for magnetic recording storage", invited paper. The Asilomar Conference on Signals, Systems, and Computers, Nov. 2008.
K. Gunnam et al., "Value-Reuse Properties of Min-Sum for GF(q)" (dated Oct. 2006) Dept. of ECE, Texas A&M University Technical Note, published about Aug. 2010.
K. Gunnam et al., "Value-Reuse Properties of Min-Sum for GF(q)"(dated Jul. 2008) Dept. of ECE, Texas A&M University Technical Note, published about Aug. 2010.
K. Gunnam "Area and Energy Efficient VLSI Architectures for Low-Density Parity-Check Decoders Using an On-The-Fly Computation" dissertation at Texas A&M University, Dec. 2006.
Han and Ryan, "Pinning Techniques for Low-Floor Detection/Decoding of LDPC-Coded Partial Response Channels", 5th International Symposium on Turbo Codes &Related Topics, 2008.
Hagenauer, J. et al A Viterbi Algorithm with Soft-Decision Outputs and its Applications in Proc. IEEE Globecom, pp. 47. 11-47 Dallas, TX Nov. 1989.
Lee et al., "Partial Zero-Forcing Adaptive MMSE Receiver for DS-CDMA Uplink in Multicell Environments" IEEE Transactions on Vehicular Tech. vol. 51, No. 5, Sep. 2002.
Lin et al "An efficient VLSI Architecture for non binary LDPC decoders"—IEEE Transaction on Circuits and Systems II vol. 57, Issue 1 (Jan. 2010) pp. 51-55.
Mohsenin et al., "Split Row: A Reduced Complexity, High Throughput LDPC Decoder Architecture", pp. 1-6, printed from www.ece.ucdavis.edu on Jul. 9, 2007.
Moon et al, "Pattern-dependent noise prediction in signal-dependent Noise," IEEE JSAC, vol. 19, No. 4 pp. 730-743, Apr. 2001.
Perisa et al "Frequency Offset Estimation Based on Phase Offsets Between Sample Correlations" Dept. of Info. Tech. University of Ulm 2005.
Sari H et al., "Transmission Techniques for Digital Terrestrial TV Broadcasting" IEEE Communications Magazine, IEEE Service Center NY, NY vol. 33, No. 2 Feb. 1995.
Selvarathinam, A.: "Low Density Parity-Check Decoder Architecture for High Throughput Optical Fiber Channels" IEEE International Conference on Computer Design (ICCD '03) 2003.
Shu Lin, Ryan, "Channel Codes, Classical and Modern" 2009, Cambridge University Press, pp. 213-222.
Unknown, "Auto threshold and Auto Local Threshold" [online] [retrieved May 28, 2010] Retrieved from the Internet: <URL:http://www.dentristy.bham.ac.uk/landinig/software/autoth.
Vasic, B., "High-Rate Low-Density Parity-Check Codes Based on Anti-Pasch Affine Geometries," Proc ICC 2002, pp. 1332-1336.
Vasic, B., "High-Rate Girth-Eight Codes on Rectangular Integer Lattices", IEEE Trans. Communications, vol. 52, Aug. 2004, pp. 1248-1252.
Wang Y et al., "A Soft Decision Decoding Scheme for Wireless COFDM With Application to DVB-T" IEEE Trans. on Consumer elec., IEEE Service Center, NY,NY vo. 50, No. 1 Feb. 2004.
Weon-Cheol Lee et al., "Vitierbi Decoding Method Using Channel State Info. in COFDM System" IEEE Trans. on Consumer Elect., IEEE Service Center, NY, NY vol. 45, No. 3 Aug. 1999.
Xia et al, "A Chase-GMD algorithm of Reed-Solomon codes on perpendicular channels", IEEE Transactions on Magnetics, vol. 42 pp. 2603-2605, Oct. 2006.
Xia et al, "Reliability-based Reed-Solomon decoding for magnetic recording channels", IEEE International Conference on Communication pp. 1977-1981, May 2008.
Yeo et al., "VLSI Architecture for Iterative Decoders in Magnetic Storage Channels", Mar. 2001, pp. 748-755, IEEE trans. Magnetics, vol. 37, No. 2.
Youn, et al. "BER Perform. Due to Irrreg. of Row-Weight Distrib. of the Parity-Chk. Matrix in Irreg. LDPC Codes for 10-Gb/s Opt. Signls" Jrnl of Lightwave Tech., vol. 23, Sep. 2005.
Zhong et al., "Area-Efficient Min-Sum Decoder VLSI Architecture for High-Rate QC-LDPC Codes in Magnetic Recording", pp. 1-15, Submitted 2006, not yet published.
Zhong, "Block-LDPC: A Practical LDPC Coding System Design Approach", IEEE Trans. on Circuits, Regular Papers, vol. 5, No. 4, pp. 766-775, Apr. 2005.
Zhong et al., "Design of VLSI Implementation-Oriented LDPC Codes", IEEE, pp. 670-673, 2003.
Zhong et al., "High-Rate Quasi-Cyclic LDPC Codes for Magnetic Recording Channel with Low Error Floor", ISCAS, IEEE pp. 3546-3549, May 2006.
Zhong et al., "Iterative MAX-LOG-MAP and LDPC Detector/Decoder Hardware Implementation for Magnetic Read Channel", SRC TECHRON, pp. 1-4, Oct. 2005.
Zhong et al., "Joint Code-Encoder Design for LDPC Coding System VLSI Implementation", ISCAS, IEEE pp. 389-392, May 2004.
Zhong et al., "Quasi Cyclic LDPC Codes for the Magnetic Recording Channel: Code Design and VSLI Implementation", IEEE Transactions on Magnetics, v. 43, pp. 1118-1123, Mar. 7.
Zhong, "VLSI Architecture of LDPC Based Signal Detection and Coding System for Magnetic Recording Channel", Thesis, RPI, Troy, NY, pp. 1-95, May 2006.

* cited by examiner

SYSTEMS AND METHODS FOR ANTI-CAUSAL NOISE PREDICTIVE FILTERING IN A DATA CHANNEL

BACKGROUND OF THE INVENTION

The present invention is related to systems and methods for data processing, and more particularly to systems and methods for noise predictive filtering in data processing.

Data processing circuits often include a data detector circuit and a data decoder circuit. In some cases many passes through both the data detector circuit and the data decoder circuit in an attempt to recover originally written data. One of the main causes limiting the ability to recover originally written data is media noise corrupting information received from a channel. To limit the effects of media noise, the data processing circuit may include a noise predictive filter circuit that relies on historical information to predict potential noise corruption. Such an approach is not ideal.

Hence, for at least the aforementioned reasons, there exists a need in the art for advanced systems and methods for data processing.

BRIEF SUMMARY OF THE INVENTION

The present invention is related to systems and methods for data processing, and more particularly to systems and methods for noise predictive filtering in data processing.

Various embodiments of the present invention provide data processing circuits that include a data detector circuit. The data detector circuit includes an anti-causal noise predictive filter circuit and a data detection circuit. In some cases, the anti-causal noise predictive filter circuit is operable to apply noise predictive filtering to a detector input to yield a filtered output, and the data detection circuit is operable to apply a data detection algorithm to the filtered output derived from the anti-causal noise predictive filter circuit. In various instances of the aforementioned embodiments, the data processing circuit is implemented as part of a storage device or a receiving device. In some cases, the data processing circuit is implemented as part of an integrated circuit. The data detection algorithm may be, but is not limited to, a maximum a posteriori data detection algorithm, or a Viterbi algorithm data detector circuit In some instances of the aforementioned embodiments, the anti-causal noise predictive filter circuit includes a delay buffer circuit and a noise predictive filter bank. In some such cases, the noise predictive filter bank includes sixteen anti-causal noise predictive filters each tuned to a different noise pattern. The different noise patterns may include at least one future noise sample and/or at least one prior noise sample. In various cases, the data detector circuit is operable to provide a detected output, and the data processing circuit further includes a data decoder circuit operable to apply a data decoding algorithm to decoder input derived from the detected output. The data decoding algorithm may be, but is not limited to, a Reed Solomon data decoding algorithm, and a low density parity check decoding algorithm. In some cases, the data processing circuit further includes an analog to digital converter circuit operable to convert an analog input into a series of digital samples, and an equalizer circuit operable to receive the series of digital samples and to equalize the series of digital samples to yield the detector input.

Some embodiments of the present invention provide methods that include: receiving a data input; anti-causal noise predictive filtering the data input to yield a filtered output; and applying a data detection algorithm to the filtered output to yield a detected output. In some cases, the methods further includes applying a data decoding algorithm to the detected output to yield a decoded output. The data decoding algorithm may be, but is not limited to, a Reed Solomon data decoding algorithm, or a low density parity check decoding algorithm. The data detection algorithm may be, but is not limited to, a maximum a posteriori data detection algorithm, or a Viterbi algorithm data detector circuit. In some cases, the anti-causal noise predictive filtering includes noise predictive filtering using at least one future noise sample, and/or at least one prior noise sample.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to systems and methods for data processing, and more particularly to systems and methods for noise predictive filtering in data processing.

It has been determined that when information is run length limited (i.e., the number of successive non-transitory bit periods is limited) causal noise predictive filtering is not ideal as burst errors caused by long runs (i.e., four or more consecutive bit periods) are dominant in a read channel or receiver channel. By encoding originally written data to avoid such long runs, the dominance of such burst errors can be reduced and performance improved. In some cases, runs of a maximum of three consecutive non-transitory bit periods are allowed. In such a situation, it has been observed that bits at the beginning of such a transition limited run exhibited a higher probability of error. To address this asymmetry in the occurrence of errors, anti-causal noise predictive filtering as more fully discussed below. In some embodiments of the present invention, use of such anti-causal noise predictive filtering balances the error locations across non-transitory runs resulting in an improved bit error rate.

Various embodiments of the present invention provide for data processing that includes application of a data detection algorithm to a received data set followed by application of a data decoding algorithm to the result of the data detection algorithm in an attempt to recover originally written data. In some cases, two or more global iterations including application of the data detection algorithm and the data decoding algorithm may be applied to a given data set. Application of the data detection algorithm includes performing anti-causal noise predictive filtering on the received data set to yield a filtered output, with the filtered output then being provided to a trellis based detector circuit that applies the data detection algorithm.

As used herein, the term "anti-causal" is used in its broadest sense to mean any condition where at least post occurrence information is used to determine a current occurrence. In contrast, the term "causal" implies a condition where only pre-occurrence and/or current occurrence information is used to determine a current occurrence. Thus, as an example, an anti-causal circuit may rely on the following five data inputs $i_{-2}, i_{-1}, i_0, i_{+1}, i_{+2}$, where $i_{-2}$ occurs two bit periods prior to the current occurrence, $i_{-1}$ occurs one bit periods prior to the current occurrence, $i_0$ is the current occurrence, $i_{-1}$ occurs one bit periods after the current occurrence, and $i_{+2}$ occurs two bit periods after the current occurrence. In contrast, a causal circuit may rely on the following five data inputs $i_{-4}, i_{-3}, i_{-2}, i_{-1}, i_0$, where $i_{-4}$ occurs four bit periods prior to the current occurrence, where $i_{-3}$ occurs three bit periods prior to the current occurrence, where $i_{-2}$ occurs two bit periods prior to the current occurrence, $i_{-1}$ occurs one bit periods prior to the current occurrence, and $i_0$ is the current occurrence. Based upon the disclosure provided herein, one of ordinary skill in the art will recognize a variety of data sets upon which an anti-causal noise predictive filter circuit may operate in accordance with different embodiments of the present invention. In some embodiments of the present invention, an anti-causal noise predictive filter is used that relies on one or more future noise samples to estimate a current noise level (e.g., $n_{+1}$, where $n_{+1}$ is a noise sample occurring one bit period after the current noise sample $n_0$). In some cases, such an anti-causal noise predictive filter relies on one or more future noise samples and none or more past noise samples (e.g., $n_{+1}$ where $n_{+1}$ is a noise sample occurring one bit period after the current noise sample $n_0$, and $n_{-1}$ where $n_{-1}$ is a noise sample occurring one bit period prior to the current noise sample $n_0$).

Figure 1:
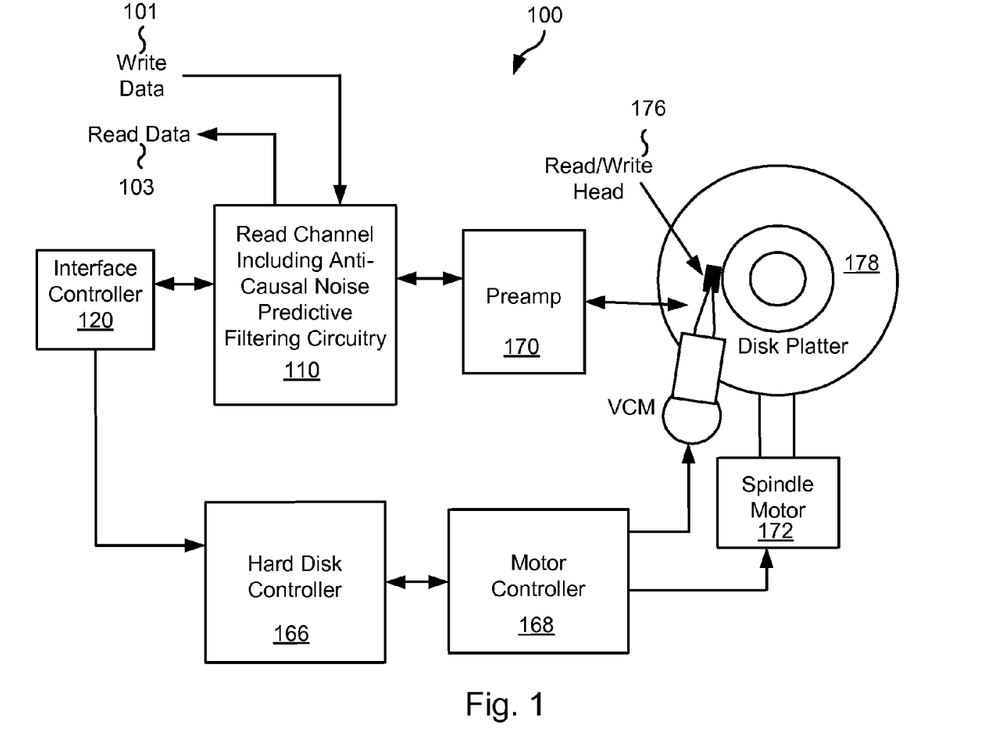
FIG. 1 shows a storage device including a read channel having anti-causal noise predictive filtering circuitry in accordance with one or more embodiments of the present invention.

Turning to FIG. 1, a storage system 100 including a read channel circuit 110 having anti-causal noise predictive filtering circuitry is shown in accordance with some embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head assembly 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 178 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

During a read operation, data received from preamplifier circuit 170 is converted from an analog signal to a series of corresponding digital samples, and the digital samples are equalized to yield an equalized output. The equalized output is then provided to a data detection circuit. The data detection circuit includes an anti-causal noise predictive filtering circuit that yields a filtered output, and the filtered output is provided to a trellis based detector circuit that applies a data detection algorithm to the filtered output to yield a detected output. The detected output is then provided to a data decoder circuit that applies a data decode algorithm to the detected output to yield a decoded output. Application of the data detection algorithm by the data detector circuit and the data decoder algorithm by the data decoder circuit is done in a global iteration. In some cases, two or more global iterations may be applied to a given data set in an attempt to recover originally written data that is ultimately provided as read data 103. In some cases, the data processing may be done using a circuit similar to data processing circuit 300, and/or using a process similar to that discussed below in relation to FIG. 4.

It should be noted that storage system 100 may be integrated into a larger storage system such as, for example, a RAID (redundant array of inexpensive disks or redundant array of independent disks) based storage system. It should also be noted that various functions or blocks of storage system 100 may be implemented in either software or firmware, while other functions or blocks are implemented in hardware.

Figure 2:
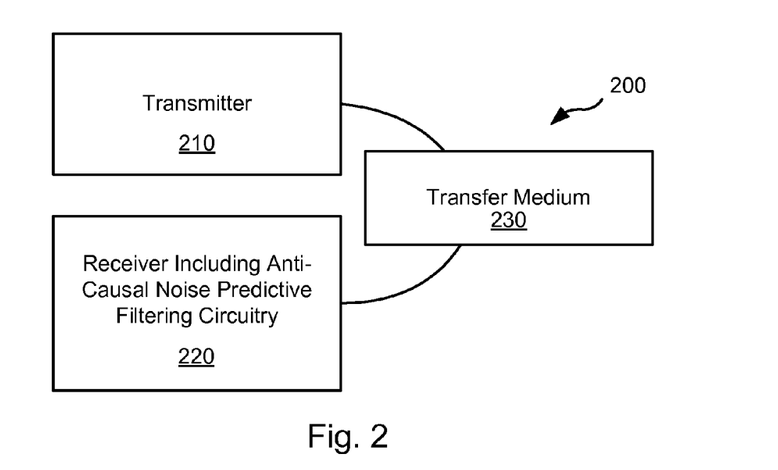
FIG. 2 shows a data transmission device including a receiver having anti-causal noise predictive filtering circuitry in accordance with some embodiments of the present invention.

Turning to FIG. 2, a data transmission device 200 including a receiver 220 having anti-causal noise predictive filtering circuitry is shown in accordance with some embodiments of the present invention. Data transmission system 200 includes a transmitter 210 that is operable to transmit encoded information via a transfer medium 230 as is known in the art. The encoded data is received from transfer medium 230 by receiver 220. Receiver 220 incorporates a data processing circuit that includes an anti-causal noise prediction circuit. While processing received data, an analog signal is converted to a series of corresponding digital samples, and the digital samples are equalized to yield an equalized output. The equalized output is then provided to a data detection circuit. The data detection circuit includes an anti-causal noise predictive filtering circuit that yields a filtered output, and the filtered output is provided to a trellis based detector circuit that applies a data detection algorithm to the filtered output to yield a detected output. The detected output is then provided to a data decoder circuit that applies a data decode algorithm to the detected output to yield a decoded output. Application of the data detection algorithm by the data detector circuit and the data decoder algorithm by the data decoder circuit is done in a global iteration. In some cases, two or more global iterations may be applied to a given data set in an attempt to recover originally written data that is ultimately provided as read data 103. In some cases, the data processing may be done using a circuit similar to data processing circuit 300, and/or using a process similar to that discussed below in relation to FIG. 4.

Figure 3A:
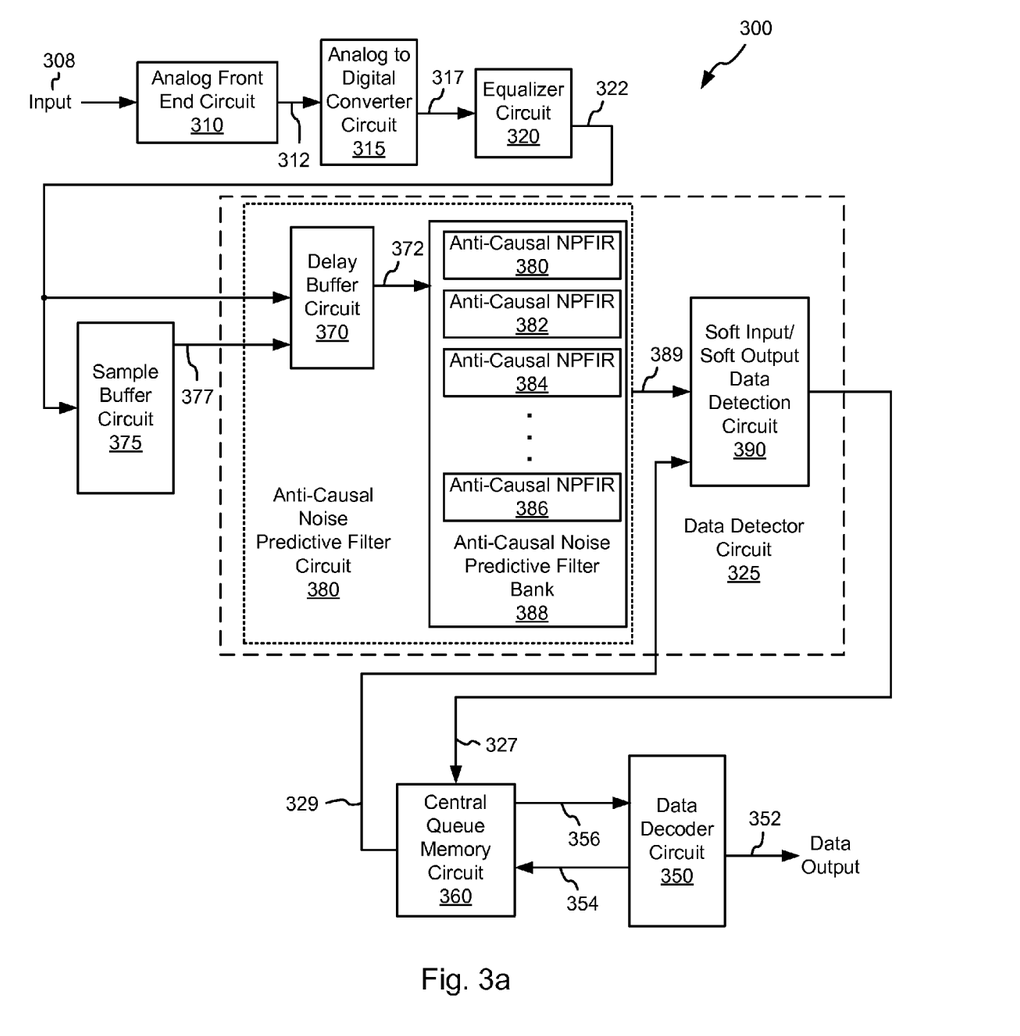
FIG. 3a depicts a data processing circuit having anti-causal noise predictive filtering circuitry in accordance with some embodiments of the present invention.

Turning to FIG. 3a, a data processing circuit 300 is shown that includes anti-causal noise predictive filtering circuitry in accordance with some embodiments of the present invention; in accordance with some embodiments of the present invention. In addition to the anti-causal noise prediction filtering circuitry, the data detector circuit of data processing circuit 300 is constructed to operate on a time shifted data set allowing time for post occurrence noise samples to be made available to the anti-causal noise predictive filtering circuitry.

Data processing circuit 300 includes an analog front end circuit 310 that receives an analog signal 308. Analog front end circuit 310 processes analog signal 308 and provides a processed analog signal 312 to an analog to digital converter circuit 315. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog signal 308 is derived from a read/write head assembly (not shown) that is disposed in relation to a storage medium (not shown). In other cases, analog signal 308 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 308 may be derived.

Analog to digital converter circuit 315 converts processed analog signal 312 into a corresponding series of digital samples 317. Analog to digital converter circuit 315 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 317 are provided to an equalizer circuit 320. Equalizer circuit 320 applies an equalization algorithm to digital samples 317 to yield an equalized output 322. In some embodiments of the present invention, equalizer circuit 320 is a digital finite impulse response filter circuit as are known in the art.

Equalized output 322 is provided to both a data detector circuit 325 and to a sample buffer circuit 375. Sample buffer circuit 375 stores equalized output 322 as buffered data 377 for use in subsequent iterations through data detector circuit 325. Data detector circuit 325 includes an anti-causal noise predictive filter circuit 380 and a soft input/soft output data detection circuit 390. Anti-causal noise predictive filter circuit 380 includes a delay buffer circuit 370 that accumulates a number of noise samples (n) that are provided as a noise sample output 372 to an anti-causal noise predictive filter bank 388. Anti-causal noise predictive filter bank 388 includes a number of anti-causal noise predictive finite impulse response (FIR) filters 380, 382, 384, 386 that each operate on one or more future noise samples. Anti-causal noise predictive filter bank 388 provides a current noise level as a filtered output 389 with the current noise level being based at least in part on one future noise sample.

Filtered output 389 from anti-causal noise predictive filter circuit 380 is described by the following equation:

$$n_k = y_k - y_{k,ideal} = y_k - \sum_{i=0}^{I} g_i x_{k-i},$$

where $n_k$ is noise samples at time k, $y_k$ is equalized output 322 (or buffered output 377 depending upon the particular global iteration), $x_k$ is digital samples 317, and $\{g_i\}$ is a partial response target. This can be reduced to:

$$\hat{n}_k = \sum_{l=-z}^{+w} f_l n_{k-l},$$

where $\hat{n}_k$ is the predicted noise at time k, $\{f_l\}$ is an anti-causal noise predictive filter function at time l, w represents a number of prior noise samples, and z represents a number of future bit samples. The predicted error ($e_k$) at time k may be expressed as:

$$\text{filtered output } 389 = e_k$$
$$= n_k - \hat{n}_k$$
$$= n_k - \sum_{l=-z}^{+w} f_l n_{k-l}.$$

In one particular embodiment of the present invention, each of anti-causal noise predictive finite impulse response (FIR) filters 380, 382, 384, 386 operates on five noise samples (two prior noise samples [$n_{-2}$ that is a noise sample occurring two bit periods before the current noise sample $n_0$, and $n_{-1}$ that is a noise sample occurring one bit period before the current noise sample $n_0$], one current noise sample [$n_0$], and two future noise samples [$n_{+1}$ that is a noise sample occurring one bit period after the current noise sample $n_0$, and $n_{+2}$ that is a noise sample occurring two bit periods after the current noise sample $n_0$]). The current noise level provided as filtered output 389 corresponds to the bit period of $n_0$. Of note, the use of five noise samples may be changed depending upon the particular embodiment, and based upon the disclosure provided herein, one of ordinary skill in the art will recognize other numbers of noise samples that may be used in relation to different embodiments of the present invention. Further, one of ordinary skill in the art will recognize that the noise samples may be all future noise samples, a combination of the current noise sample and one or more future noise samples, and/or a combination of one or more prior noise samples, the current noise sample, and one or more future noise samples depending upon the particular implementation.

Figure 3B:
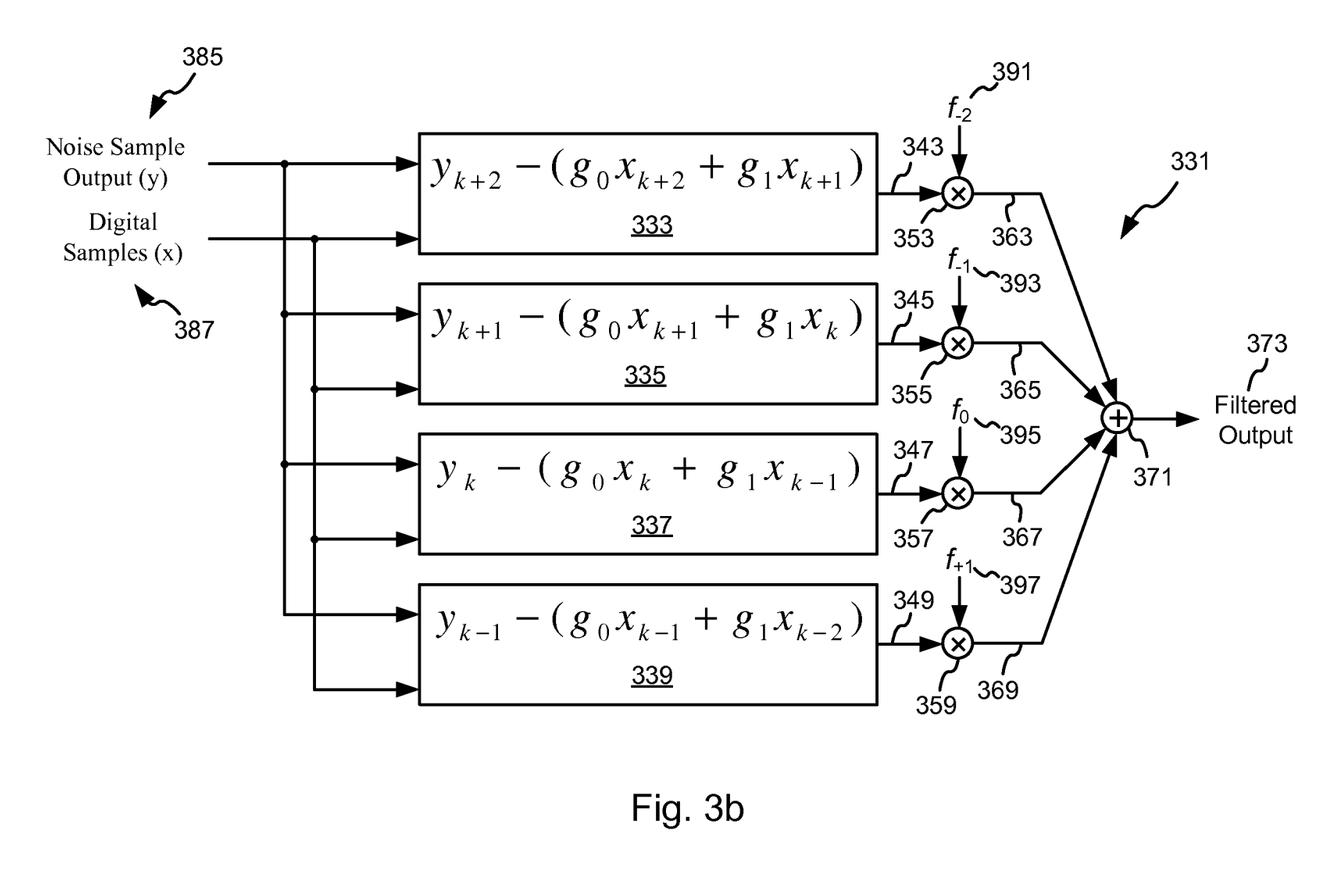
FIG. 3b depicts an anti-causal noise predictive filter bank that may be used in relation to the data processing circuit of FIG. 3b.

Turning to FIG. 3b, an example anti-causal noise predictive filter bank 331 is shown that may be used in place of anti-causal noise predictive filter back 388 of FIG. 3b. Anti-causal noise predictive filter bank 331 receives a noise sample output 385, digital samples 387, and provides a filtered output 373. Where anti-causal noise predictive filter bank 331 is used in place of anti-causal noise predictive filter bank 388 of FIG. 3a, noise sample output 385 is connected to noise sample output 372, digital samples 387 is connected to digital samples 317, and filtered output 373 is connected to filtered output 389. Anti-causal noise predictive filter bank 331 includes four anti-causal noise predictive filter circuits 333, 335, 337, 339. Of note, more or fewer than four anti-causal noise predictive filter circuits may be used in relation to different embodiments of the present invention.

Anti-causal noise predictive filter circuit 333 applies the following algorithm to the combination of noise sample output 385 and digital samples 387:

$$y_{k+2}-(g_0x_{k+2}+g_1x_{k+1}),$$

where $g_0$ and $g_1$ represent partial response filter taps. Anti-causal noise predictive filter circuit 333 provides the result as an output 343 to a filter circuit 353. Anti-causal noise predictive filter circuit 335 applies the following algorithm to the combination of noise sample output 385 and digital samples 387:

$$y_{k+1}-(g_0x_{k+1}+g_1x_k)$$

that is provided as an output 345 to a filter circuit 355; anti-causal noise predictive filter circuit 337 applies the following algorithm to the combination of noise sample output 385 and digital samples 387:

$$y_k-(g_0x_k+g_1x_{k-1})$$

that is provided as an output 347 to a filter circuit 357; and anti-causal noise predictive filter circuit 339 applies the following algorithm to the combination of noise sample output 385 and digital samples 387:

$$y_{k-1}-(g_0x_{k-1}+g_1x_{k-2})$$

that is provided as an output 349 to a filter circuit 359.

Filter circuit 353 applies a noise filter ($f_{-2}$) to yield an output 363 that is provided to a summation circuit 371; filter circuit 355 applies a noise filter ($f_{-1}$) to yield an output 365 that is provided to summation circuit 371; filter circuit 357 applies a noise filter ($f_0$) to yield an output 367 that is provided to summation circuit 371; and filter circuit 359 applies a noise filter ($f_{-1}$) to yield an output 369 that is provided to summation circuit 371. $f_{-2}$ is the causal noise predictive filter function corresponding to an occurrence two bit periods prior to the current occurrence; $f_{-1}$ is the causal noise predictive filter function corresponding to an occurrence one bit period prior to the current occurrence; $f_0$ is the causal noise predictive filter function corresponding to the current occurrence; and $f_{+1}$ is the causal noise predictive filter function corresponding to an occurrence one bit period after to the current occurrence. Summation circuit 371 aggregates outputs 363, 365, 367, 369 to yield a filtered output 373.

The noise filters may be trained using approaches similar to that used to train causal noise predictive filters. In one particular embodiment of the present invention, training is done that includes constraining the main filter tap $f_0$ to unit while other taps are trained. The trained filter taps can be scaled to facilitate a particular hardware implementation.

As a contrast to the anti-causal implementation, where anti-causal noise predictive filter bank 331 was implemented as a causal noise predictive filter bank, the function of block 333 would be replaced with:

$$y_k-(g_0x_k+g_1x_{k-1});$$

the function of block 335 would be replaced with:

$$y_{k-1}-(g_0x_{k-1}+g_1x_{k-2});$$

the function of block 337 would be replaced with:

$$y_{k-2}-(g_0x_{k-2}+g_1x_{k-3}); \text{ and}$$

the function of block 339 would be replaced with:

$$y_{k-3}-(g_0x_{k-3}+g_1x_{k-4}).$$

The filter function applied by filter circuit 353 would be $f_0$, the filter function applied by filter circuit 355 would be $f_1$, the filter function applied by filter circuit 357 would be $f_2$, and the filter function applied by filter circuit 353 would be $f_3$.

Returning to FIG. 3a, soft input/soft output data detection circuit 390 is a trellis based data detection circuit that applied a data detection algorithm to filtered output 389 to yield a detect output 327. The data detection algorithm may be any trellis based data detection algorithm known in the art. As some examples, the data detection algorithm may be, but is not limited to, a Viterbi data detection algorithm or a maximum a posteriori data detection algorithm are known in the art. Based upon the disclosure provided herein, one of ordinary skill in the art will recognize a variety of data detection algorithms that may be used in relation to different embodiments of the present invention. Data detection circuit 390 may be implemented the same as a data detection circuit would be implemented had a causal noise predictive filter been used in place of anti-causal noise predictive filter circuit 380.

Detected output 327 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 327 is provided to a central queue memory circuit 360 that operates to buffer data passed between data detector circuit 325 and a data decoder circuit 350. When data decoder circuit 350 is available, data decoder circuit 350 receives detected output 327 from central queue memory 360 as a decoder input 356. Data decoder circuit 350 applies a data decoding algorithm to decoder input 356 in an attempt to recover originally written data. The result of the data decoding algorithm is provided as a decoded output 354. Similar to detected output 327, decoded output 354 may include both hard decisions and soft decisions. For example, data decoder circuit 350 may be any data decoder circuit known in the art that is capable of applying a decoding algorithm to a received input. Data decoder circuit 350 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 350 provides the result of the data decoding algorithm as a data output 352.

One or more iterations through the combination of data detector circuit 325 and data decoder circuit 350 may be made in an effort to converge on the originally written data set. As mentioned above, processing through both the data detector and the data decoder is referred to as a "global iteration". Further, one or more iterations may be made through data decoder circuit 350 during any given global iteration. These iterations through data decoder circuit 350 are referred to as "local iterations". For the first global iteration, data detector circuit 325 applies the data detection algorithm without guidance from a decoded output. For subsequent global iterations, data detector circuit 325 applies the data detection algorithm to buffered data 377 as guided by decoded output 354. Decoded output 354 is received from central queue memory 360 as a detector input 329.

Figure 4:
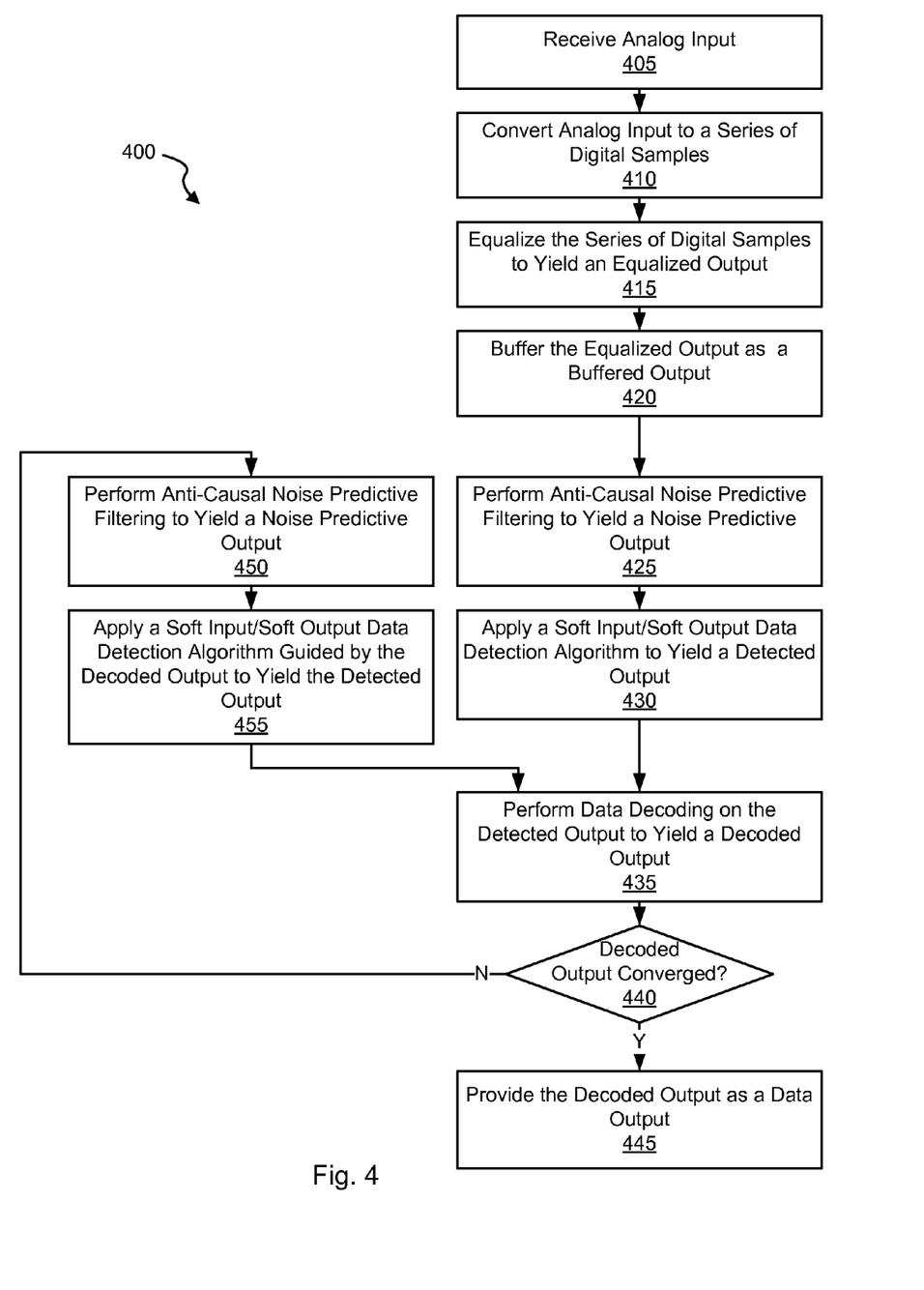
FIG. 4 is a flow diagram showing a method in accordance with one or more embodiments of the present invention for data processing including anti-causal noise predictive filtering.

Turning to FIG. 4, a flow diagram 400 shows a method in accordance with one or more embodiments of the present invention for data processing including anti-causal noise predictive filtering. Following flow diagram 400, an analog input is received (block 405). The analog input may be derived from, for example, a storage medium or a data transmission channel. Based upon the disclosure provided herein, one of ordinary skill in the art will recognize a variety of sources of the analog input. The analog input is converted to a series of digital samples (x[k]) (block 410). This conversion may be done using an analog to digital converter circuit or system as are known in the art. Of note, any circuit known in the art that is capable of converting an analog signal into a series of digital values representing the received analog signal may be used. The resulting digital samples are equalized to yield an equalized output (y[k]) (block 415). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention. Of note, the equalized output may include both electronic noise and media noise. The equalized output is stored to a memory as a buffered output (block 420).

Anti-causal noise predictive filtering is performed to yield a noise predictive output (block 425). This anti-causal noise predictive filtering may be done similar to a corresponding causal noise predictive filtering except that at least one future noise sample is incorporated into the filtering. The resulting filtered output provided by the anti-causal noise predictive filtering is consistent with the following equations:

$$n_k = y_k - y_{k,ideal} = y_k - \sum_{i=0}^{l} g_i x_{k-i},$$

where $n_k$ is noise samples at time k, $y_k$ is equalized output 322 (or buffered output 377 depending upon the particular global iteration), $x_k$ is digital samples 317, and $\{g_i\}$ is a partial response target. This can be reduced to:

$$\hat{n}_k = \sum_{l=-z}^{+w} f_l n_{k-l},$$

where $\hat{n}_k$ is the predicted noise at time k, $\{f_l\}$ is an anti-causal noise predictive filter function at time l, w represents a number of prior noise samples, and z represents a number of future bit samples. The predicted error ($e_k$) at time k may be expressed as:

$$\text{filtered output} = e_k$$
$$= n_k - \hat{n}_k$$
$$= n_k - \sum_{l=-z}^{+w} f_l n_{k-l}.$$

In one particular embodiment of the present invention, the anti-causal noise predictive finite impulse response operates on five noise samples (two prior noise samples [$n_{-2}$ that is a noise sample occurring two bit periods before the current noise sample $n_0$, and $n_{-1}$ that is a noise sample occurring one bit period before the current noise sample $n_0$], one current noise sample [$n_0$], and two future noise samples [$n_{+1}$ that is a noise sample occurring one bit period after the current noise sample $n_0$, and $n_{+2}$ that is a noise sample occurring two bit periods after the current noise sample $n_0$]). The current noise level provided as filtered output 389 corresponds to the bit period of $n_0$. Of note, the use of five noise samples may be changed depending upon the particular embodiment, and based upon the disclosure provided herein, one of ordinary skill in the art will recognize other numbers of noise samples that may be used in relation to different embodiments of the present invention. Further, one of ordinary skill in the art will recognize that the noise samples may be all future noise samples, a combination of the current noise sample and one or more future noise samples, and/or a combination of one or more prior noise samples, the current noise sample, and one or more future noise samples depending upon the particular implementation.

A soft input/soft output data detection algorithm is applied to yield a detected output (block 430). The data detection algorithm may be any trellis based data detection algorithm known in the art. As some examples, the data detection algorithm may be, but is not limited to, a Viterbi data detection algorithm or a maximum a posteriori data detection algorithm are known in the art. Based upon the disclosure provided herein, one of ordinary skill in the art will recognize a variety of data detection algorithms that may be used in relation to different embodiments of the present invention. The resulting detected output may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

A data decode algorithm is applied to the detected output to yield a decoded output (block 435). The data decode algorithm may be, but is not limited to, a low density parity check decode algorithm or a Reed Solomon decode algorithm as are known in the art. Based upon the disclosure provided herein, one of ordinary skill in the art will recognize a variety of data decode algorithms that may be used in relation to different embodiments of the present invention. It is determined whether the decoded output converged (block 440). Where the decoded output converged (block 440), it is provided as a data output (block 445).

Alternatively, where the decoded output failed to converge (block 440), a subsequent anti-causal noise predictive filtering is performed similar to that described above in relation to block 425 to yield a noise predictive output (block 450). A soft input/soft output data detection algorithm is applied to yield a detected output similar to that described above in relation to block 430, except that the algorithm is guided by the decoded output (block 455). At this juncture, a subsequent data decode is performed (block 435).

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing circuit, the data processing circuit comprising:
    an equalizer circuit operable to apply an equalization algorithm to a data input to yield an equalized output;
    a data detector circuit including:
        an anti-causal noise predictive filter circuit operable to apply noise predictive filtering to a detector input derived from the equalized output to yield a filtered output; and
        a data detection circuit operable to apply a data detection algorithm to the filtered output to yield a detected output.

2. The data processing circuit of claim 1, wherein the anti-causal noise predictive filter circuit includes a delay buffer circuit and a noise predictive filter bank.

3. The data processing circuit of claim 2, wherein the noise predictive filter bank includes sixteen anti-causal noise predictive filters each tuned to a different noise pattern.

4. The data processing circuit of claim 3, wherein each of the different noise patterns include at least one future noise sample.

5. The data processing circuit of claim 3, wherein each of the different noise patterns include at least one prior noise sample.

6. The data processing circuit of claim 1, wherein the data detector circuit is operable to provide a detected output, and wherein the data processing circuit further comprises:
    a data decoder circuit operable to apply a data decoding algorithm to decoder input derived from the detected output.

7. The data processing circuit of claim 1, wherein the data decoding algorithm is selected from a group consisting of: a Reed Solomon data decoding algorithm, and a low density parity check decoding algorithm.

8. The data processing circuit of claim 1, wherein the data detection algorithm is selected from a group consisting of: a maximum a posteriori data detection algorithm, and a Viterbi algorithm data detector circuit.

9. The data processing circuit of claim 1, wherein the data processing circuit further comprises:
    an analog to digital converter circuit operable to convert an analog input into a series of digital samples; and
    wherein the data input is derived from the series of digital samples.

10. The data processing circuit of claim 1, wherein the data processing circuit is implemented as part of a device selected from a group consisting of:
    a storage device and a receiving device.

11. The data processing circuit of claim 1, wherein the data processing circuit is implemented as part of an integrated circuit.

12. A method, the method comprising:
    applying an equalization algorithm to a series of digital samples to yield an equalized output;
    anti-causal noise predictive filtering a data input derived from the equalized output using an anti-causal noise predictive filter circuit to yield a filtered output; and
    applying a data detection algorithm to the filtered output to yield a detected output.

13. The method of claim 12, wherein the method further comprises:
    applying a data decoding algorithm to the detected output to yield a decoded output, wherein the data decoding algorithm is selected from a group consisting of: a Reed Solomon data decoding algorithm, and a low density parity check decoding algorithm.

14. The method of claim 12, wherein the data detection algorithm is selected from a group consisting of: a maximum a posteriori data detection algorithm, and a Viterbi algorithm data detector circuit.

15. The method of claim 12, wherein the anti-causal noise predictive filtering includes noise predictive filtering using at least one future noise sample.

16. The method of claim 12, wherein the anti-causal noise predictive filtering includes noise predictive filtering using at least one prior noise sample.

17. The method of claim 12, wherein the method further comprises:
    performing an analog to digital conversion on an analog input to yield the series of digital samples.

18. A storage device, the storage device comprising:
    a storage medium;
    a head assembly disposed in relation to the storage medium and operable to provide a sensed signal corresponding to information on the storage medium;
    a read channel circuit including:
        an analog to digital converter circuit operable to sample an analog signal derived from the sensed signal to yield a series of digital samples;
        an equalizer circuit operable to equalize the digital samples to yield a detector input; and
        a data detector circuit including an anti-causal noise predictive filter circuit and a data detection circuit, wherein the anti-causal noise predictive filter circuit is operable to apply noise predictive filtering to a detector input to yield a filtered output, and wherein the data detection circuit is operable to apply a data detection algorithm to the filtered output derived from the anti-causal noise predictive filter circuit.

19. The storage device of claim 18, wherein the anti-causal noise predictive filter circuit applies noise predictive filtering using at least one future noise sample, and at least one prior noise sample.

* * * * *